US008393375B2

(12) United States Patent
Lam

(10) Patent No.: US 8,393,375 B2
(45) Date of Patent: Mar. 12, 2013

(54) EDGE FOLDING TAPE APPLICATOR

(75) Inventor: Joe Augustine S. T. Lam, Vancouver (CA)

(73) Assignee: Lamus Enterprises Inc., Vancouver (CA)

( * ) Notice: Subject to any disclaimer, the term of this patent is extended or adjusted under 35 U.S.C. 154(b) by 346 days.

(21) Appl. No.: 12/926,087

(22) Filed: Oct. 26, 2010

(65) Prior Publication Data

US 2012/0097334 A1 Apr. 26, 2012

(51) Int. Cl.

| | |
|---|---|
| ***B32B 37/00*** | (2006.01) |
| ***B32B 38/00*** | (2006.01) |
| *B32B 38/04* | (2006.01) |
| *B65C 1/04* | (2006.01) |

(52) U.S. Cl. ..................... 156/482; 156/475; 156/477.1; 156/478; 156/479; 156/480; 156/481; 156/486; 156/487; 156/488; 156/489; 156/490; 156/491; 156/492; 156/510; 156/516; 156/517

(58) Field of Classification Search .................. 156/475, 156/476, 477.1, 478–482, 486–493, 510, 156/516, 517

See application file for complete search history.

(56) References Cited

U.S. PATENT DOCUMENTS

| | | | | |
|---|---|---|---|---|
| 4,576,674 | A * | 3/1986 | Le Tarte | 156/463 |
| 4,821,487 | A * | 4/1989 | James et al. | 53/412 |
| 4,964,942 | A * | 10/1990 | Tsuda | 156/468 |
| 7,334,620 | B2 | 2/2008 | Imazek | |
| 7,357,285 | B2 | 4/2008 | Namekawa et al. | |
| 2001/0000096 | A1 | 4/2001 | Tolerico et al. | |
| 2002/0005258 | A1 * | 1/2002 | Tsuken et al. | 156/510 |
| 2006/0175017 | A1 | 8/2006 | Namekawa et al. | |

FOREIGN PATENT DOCUMENTS

WO WO2006/032175 3/2006

* cited by examiner

*Primary Examiner* — Mark A Osele
*Assistant Examiner* — Christopher C Caillouet
(74) *Attorney, Agent, or Firm* — C. A. Rowley

(57) ABSTRACT

A commercial tape applicator capable of folding at least one side edge of a tape as it is fed to the applicator to provide an easily a gripped edge on the tape after it has been applied to the case. The invention provides a folding station on a dancer platform mounted on a dancer arm that has a nip roll at its free end and the arm is biased so that the nip roll is in contact with the periphery of a tape roll forming the source of tape and is usable to align the tape path through the folding station with the tape leaving the tape roll and accommodate deformation of the roll. A latch and cooperating cog wheel may be used to control the off feeding of the tape for the supply roll.

20 Claims, 4 Drawing Sheets

EDGE FOLDING TAPE APPLICATOR

FIELD OF INVENTION

The present invention relates to a tape applicator for applying closure tapes to cartons wherein the tape is folded upon itself to provide a gripping area along at least one side edge.

BACKGROUND OF THE PRESENT INVENTION

The concept of folding over a side edge of an adhesive coated tape that will later be applied for example to seal or close a carton or the like and provide a not stuck edge that may be gripped to facilitate opening of the carton is well known. Many hand or manually operated tape applicators have been designed and patented that fold over onto itself at least one side edge of a tape coated on one side with adhesive before it is to be applied. Examples of such devices are U.S. Pat. No. 7,334,620 issued Feb. 26, 2008 to Imazeki; U.S. Pat. No. 7357,285 issued Apr. 15, 2008 Namekawa et al.; and UP patent Applications 2001/0000096 published Apr. 5, 2001 inventor Tolerico et al.; and 2006/0175017 published Aug. 10, 2006 to Namekawa et al. Japanese PCT publication WO2006/032175 illustrates another such device. None of these devices are adapted for commercial machines that automatically apply withdraw such tape from a supply roll at a relatively high speed and apply same to a case as it is moved thereby.

It is not uncommon to provide a nip roll that is biased into engagement with the periphery of the supply roll of tape and functions to improve the smoothness with which tape is withdrawn from the roll in the taping operation.

Tape rolls do not always retain their shape and are sometimes deformed or warped; thus a system for steering or aligning the tape as it is removed from the roll into a tape path would improve the functioning of the machine by better insuring the tape is properly fed from the roll. This is particularly important when folding occurs along the feed path in a commercial machine as taught by the present invention.

BRIEF DESCRIPTION OF THE PRESENT INVENTION

It is an object of the present invention to provide a commercial tape applicator for folding a side edge of a tape and then applying the tape to the case or other object to which the tape is applied Broadly the present invention relates to a tape applicator comprising a front applicator for applying a leading end of a tape to a case being taped and a rear applicator for pressing a trailing end of said tape to said case, a connector interconnecting said front and rear applicators for interaction, a tape roll providing a source of said tape, said tape having an adhesive side and a non-adhesive side, a path of said tape from said tape roll to said front applicator, the improvement comprising; a dancer arm mounting a dancer platform that is positioned along said a path of said tape between said tape roll and said front applicator and adjacent to said tape roll, a nip roll rotatably mounted on a free end of said dancer arm adjacent to said tape roll, means biasing said dancer arm to press said nip roll onto a periphery of said tape roll and against said non adhesive side of said tape, a tape folding station mounted on said dancer platform and through which said tape on said tape path passes to fold at least one side edge of said tape onto an adjacent adhesive side of said tape to form a folded edge on said tape as said tape travels through said folding station on said path.

Preferably, said dancer arm at its end remote from said nip roll is mounted on a dancer arm pivotal mounting that allows relative side and rotational movement of said dancer arm.

Preferably, guide means are provided to sense the position of said periphery of said tape roll and align said dancer platform with said tape as said tape is drawn from said roll.

Preferably, said guide means comprises at least one flange on said nip roll that remains engaged an adjacent side face of said roll to move said nip roll and thereby said dancer platform depending on the position of said adjacent side face of said roll.

Preferably, said guide means comprises a pair of flanges one adjacent to each end of said nip roll and spaced to snugly receive side faces of said roll adjacent to said periphery of said roll to move said nip roll and thereby said dancer platform depending on the position of said side faces of said roll.

Preferably, said pivot shaft is mounted to an adjustment bar which in turn is mounted for movement perpendicular to said tape path to laterally adjust the position of said tape.

Preferably, said dancer platform is pivotably mounted on said dancer arm on a dancer platform axel and a spring biases said dancer platform to rotate on said axel in one direction Preferably, said nip roll has a cog wheel at one end and wherein a latch that cooperates with said cog wheel is fixed to said platform and moves into engagement with said cog to stop movement of said nip roller when said platform is rotated in said one direction.

Preferably, a leading edge of said dancer platform includes a tape expanding surface positioned in said tape path and over which said tape is passed as it leaves said folding station.

Preferably, said folding station further includes a center guide positioned to extend along the length of said edge folding station, said center guide having a triangular cross section with an apex of said triangular section extending along said path of said tape.

BRIEF DESCRIPTION OF THE SEVERAL VIEWS OF THE DRAWINGS

Further features, objects and advantages will be evident from the following detailed description of the preferred embodiments of the present invention taken in conjunction with the accompanying drawings in which.

DETAILED DESCRIPTION OF THE INVENTION

Figure 1:
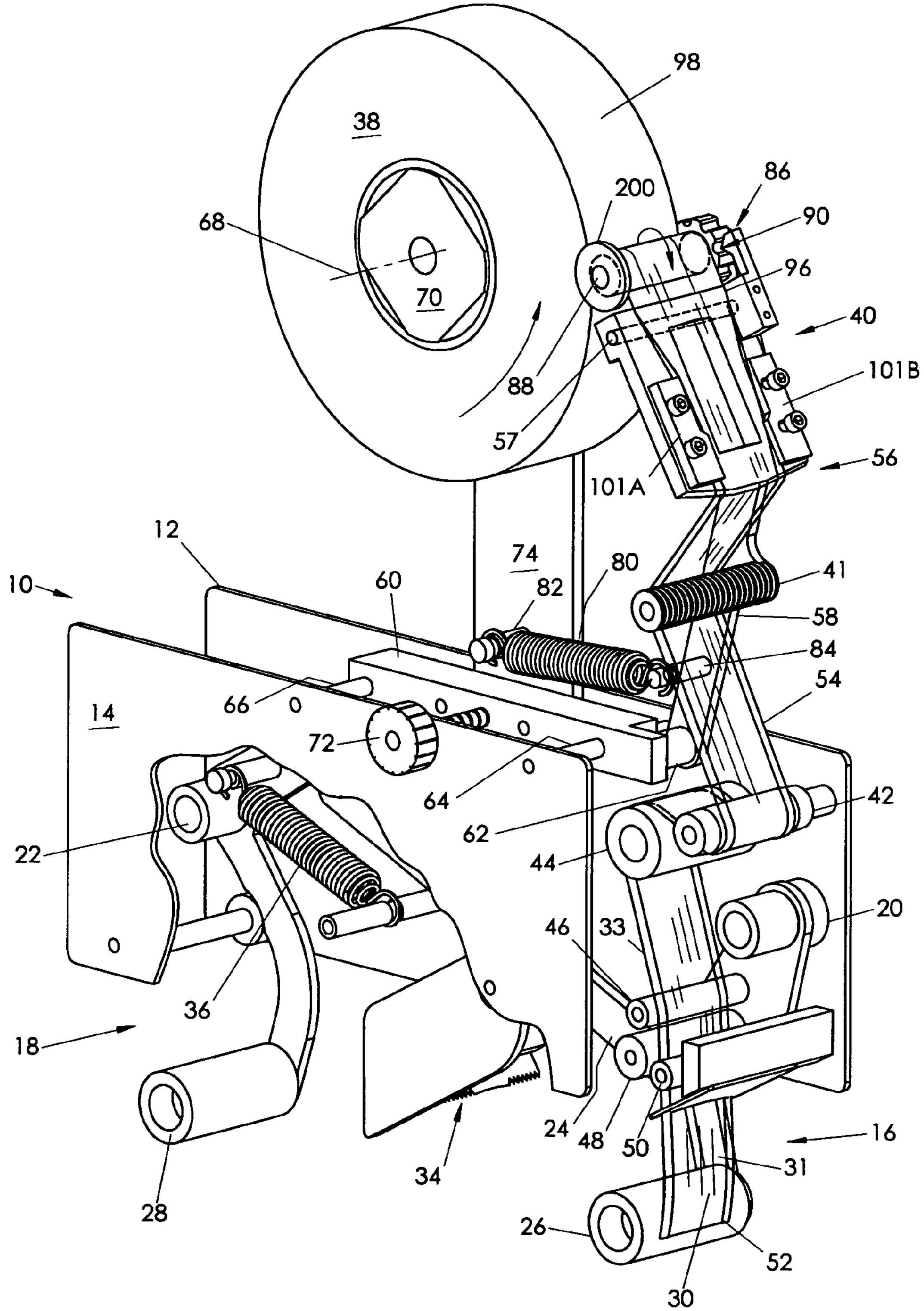
FIG. 1 is an isometric view of a tape applicator incorporating the present invention with parts omitted for clarity.

A shown in FIG. 1 the applicator 10 of the present invention is applied to an essentially well known tape applicator mechanism only parts of which have been illustrated and which is composed of a main frame 12 and a front frame 14 between which the operating parts are positioned. These operating parts include as is well know a front applicator 16 and a rear applicator 18. The front applicator 16 is pivotably mounted on the main frame 12 and functions in well known manner and is coupled for interaction with the rear applicator 18 pivotably mounted on the main frame 12 as indicated at 22 by connecting link 24. The front and rear applicators 16 and 18 each have the known wipers or applicators shown in the form of rolls 26 and 28 which as is known apply the tape 30 to the case being taped and wipe the tape against the surface of the case to ensure proper application of the tape 30 to the case 32 (see FIG. 2). The normal cut-off knife and the biasing spring of the applicator mechanism are indicated at 34 and 36 respectively.

The tape 30 which has an adhesive surface 31 and a non-adhesive surface 33 is fed from a tape roll 38 through a folding station 40 which will be described in detail herein below and then over suitable guide roll 41 (mounted on the dancer arm 58 described below) and rolls 42, 44, 46, 48 and 50 (mounted in known manner to the frame 12 or applicator 16) to the applicator roll 26 of the front applicator 16 which applies the leading end 52 of the tape 30 to the case to be taped (not shown in FIG. 1). The roll 41 is configured with undulations as is known to tend to keep the tape on course. The present invention improves the conventional commercial applicator illustrated at 10 by adding a folding station 40 between the tape supply roll 38 and the first guide roll 42 on the tape path 54 (As defined by the path 54 of the tape 30 from the roll 38 to the applicator 26).

As shown in FIG. 1 a dancer platform 56 on which the folding station 40 is positioned is pivotably mounted on a dancer arm 58 via a platform axel 57 (the function of which will be described below) which axel 57 extends as a cantilever from the arm 58. The dancer platform 56 is biased to rotate in a clockwise direction (see FIGS. 6 and 7) via the spring 59 one end of which is mounted on a holder 61 pivotably mounted on the arm 58 vial pivot pin 63 which is substantially parallel to axel 57 and the opposite end bears against the adjacent (bottom) surface 65 of the platform 56. The arm 58 is in turn pivotably mounted on a mounting and alignment adjustment bar 60 on dancer arm pivotal pivot 62 which is substantially parallel to the pivot pins 57 and 63 (which in turn are substantially parallel to the axis 68 of the mounting hub for the tape roll 38) and as will be described below provides a mounting that permits relative side and rotational movement of the arm 58 and platform 56.

The bar 60 is slidably mounted on the shafts 64 and 66 which extend between and are supported by the frames 12 and 14. The bar 60 is thus moveable essentially in a direction parallel to the axis 68 of rotation of the mounting hub 70 for the roll 38 i.e. substantially parallel to the plane of the tape 30 withdrawn from the roll 38. The position of the bar 60 on the shafts 64 and 66 is adjustable by the screw mechanism schematically indicated at 72 so that the path 54 of the tape 30 may be accurately aligned with the location to be taped. The axial length of the guide rolls 42, 44, 46, 48 and 50 and of the applicators 26 and 28 are significantly longer than the width of tape 30 to accommodate lateral adjustment of the tape path 54 obtained by lateral adjustment of the bar 60 to position the tape path as desired relative to the carton or case being taped.

Also mounted on the bar 60 is the support frame 74 for mounting roll hub 70 for roll 38 to tend to keep the tape path 54 through the folding station 40 and the tape roll in alignment.

A suitable spring 80 has one end mounted on a pin 82 on the support frame 74 and its opposite end on pin 84 fixed to the arm 58 so that the nip roll 88 mounted at the free end 86 of the arm 58 i.e. end remote from the pivotal axis 66 is biased against the periphery 98 of the tape roll 38.

Figure 7:
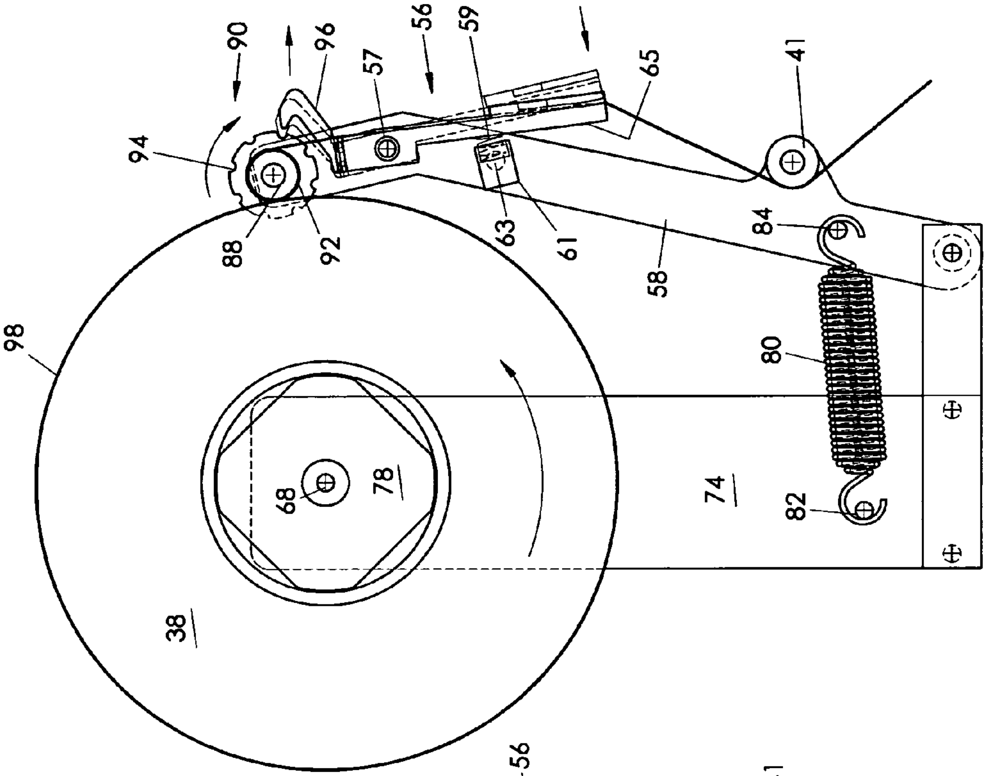
FIGS. 6 and 7 are side elevations of the dancer platform illustrating the operation of the nip roll and the movement of the dancer arm and platform to operate the latching mechanism and to maintain the nip pressure between the nip roll and the tape roll
Figure 6:
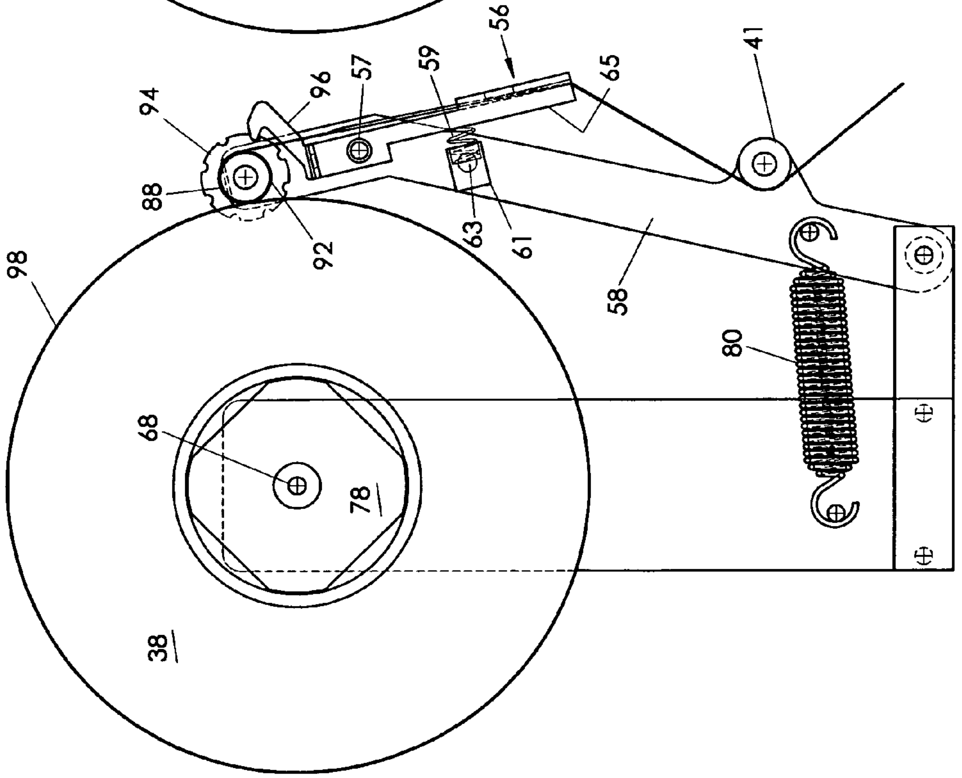

The nip roll 88 has a slip resistant cover 92 and the rotation of this roll 88 is controlled by means of the latch type clutch 90 formed by a cog wheel 94 attached to rotate with the roll 88 and a cooperating latch 96 fixed to the platform 56 adjacent to the roll 88 (see also FIGS. 6 and 7). As above described the spring 80 forces the roll 88 into engagement with the outer periphery 98 of the tape roll 38 and the slip resistant cover 92 engages the tape so there is little if any slippage between the nip roll 88 and the tape 30 and backward rotation of the roll 38 of tape is prevented (by the operation of the cog wheel 94 and latch 96) and latch when tape is not being withdrawn for the taping operation as will be described below.

Figure 3A:
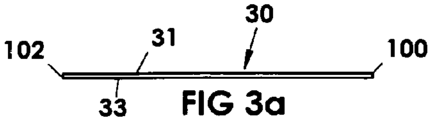
FIG. 3*a* is a section across the tape at point 3*a* in FIG. 3 prior to the tape being folded.
Figure 3B:
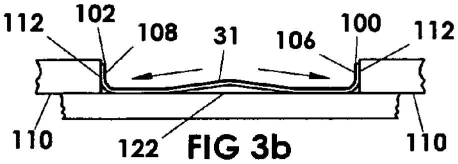
FIG. 3*b* is a section across the folding station tape at point 3*b* in FIG. 3 showing the first stage of the folding operation.
Figure 3C:
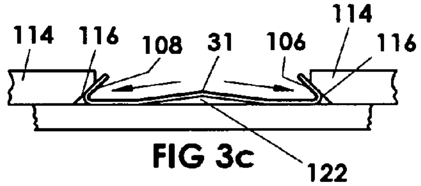
FIG. 3*c* is a section across the tape at point 3*c* in FIG. 3 showing the next stage of the folding operation.
Figure 3D:
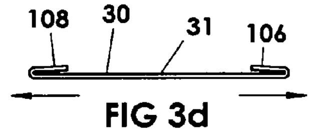
FIG. 3*d* is a section across the tape at point 3*d* in FIG. 3 showing the final stage of the folding operation.
Figure 3E:
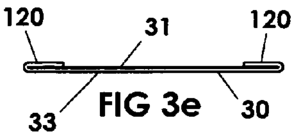
FIG. 3*e* is a section across the tape at point 3*e* in FIG. 3 showing the folded tape with both side edges folded.
Figure 3:
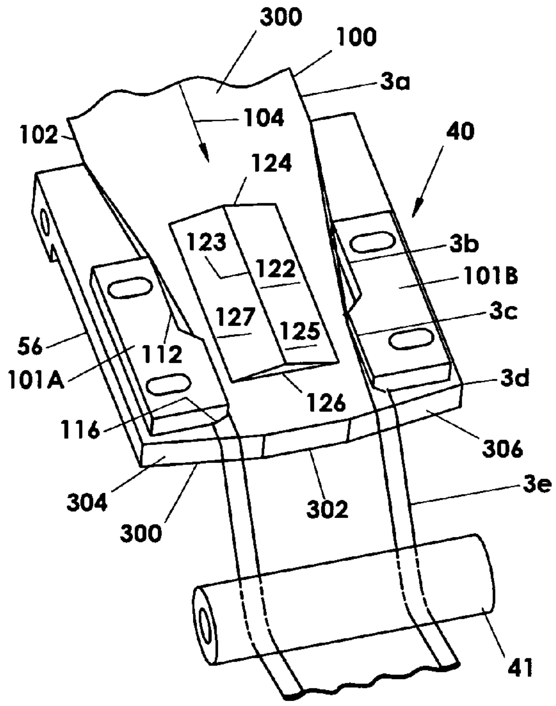
FIG. 3 is an isometric schematic illustration of the folding station of the present invention

The tape 30 is withdrawn from the tape roll 38 over the nip roll 88 with its non-adhesive surface 33 engaging the slip resistant cover 92 of the roll 88 and passes through the folding station 40 where in the illustrated arrangement both side edges 100 and 102 of the tape 30 are folded over as shown in FIGS. 3 to 3*e* inclusive by the side folding assemblies or guides 101A and 101B.

The tape 30 moves as indicated by the arrow 104 in FIG. 3 through the folding station 40 and each edge is folded onto the tape in the sequence of FIGS. 3*a* to 3*e*. In the first stage the areas adjacent to each of the edges 100 and 102 are fold as indicated at 106 and 108 to be substantially perpendicular to the plane of the remainder of the tape 30 by contact with the faces 110 of the folding blocks 112 (one at each side of the tape 30) as shown in FIG. 3*b*. The tape 30 continues its travel through the station 40 edge portions 106 and 108 and encounters plough portions 114 of the folding blocks 112 each provided with an inclined surface 116 which act to further fold the portions 106 and 108 toward the adhesive side 31 of tape 30 and moves these portions 106 and 108 against their respective adjacent portions of the tape 30 in the conventional manner as indicated in FIG. 3*d* and then into intimate contact as indicated in FIG. 3*e* to provide the two layer side edges 120 at each side of the tape 30. The so folded tape 30 then passes over the edge 300 of the platform 56 described below and onto the guide roll 41 and to the applicator 26 for application to the case in the conventional manner.

Preferably the folding station 40 will include a center guide 122 in the form of a triangular cross section plate 122 extending up from the platform base 124 of the dancer platform 56 and centered between the folding blocks 112 with the apex 123 of the triangular cross section between the contact surfaces 125 and 127 so centered and in line with the direction of travel 104 of the tape through the station 40 so that the plate 122 deforms the tape 30 which stabilizes and better insures that the tape 30 follows its intended path 54 of travel through the station 40. The lead end 124 of plate 122 is positioned up stream of the folding blocks 12 and the downstream end 126 positioned between the blocks 112 in the area of the surfaces 116.

Figure 4:
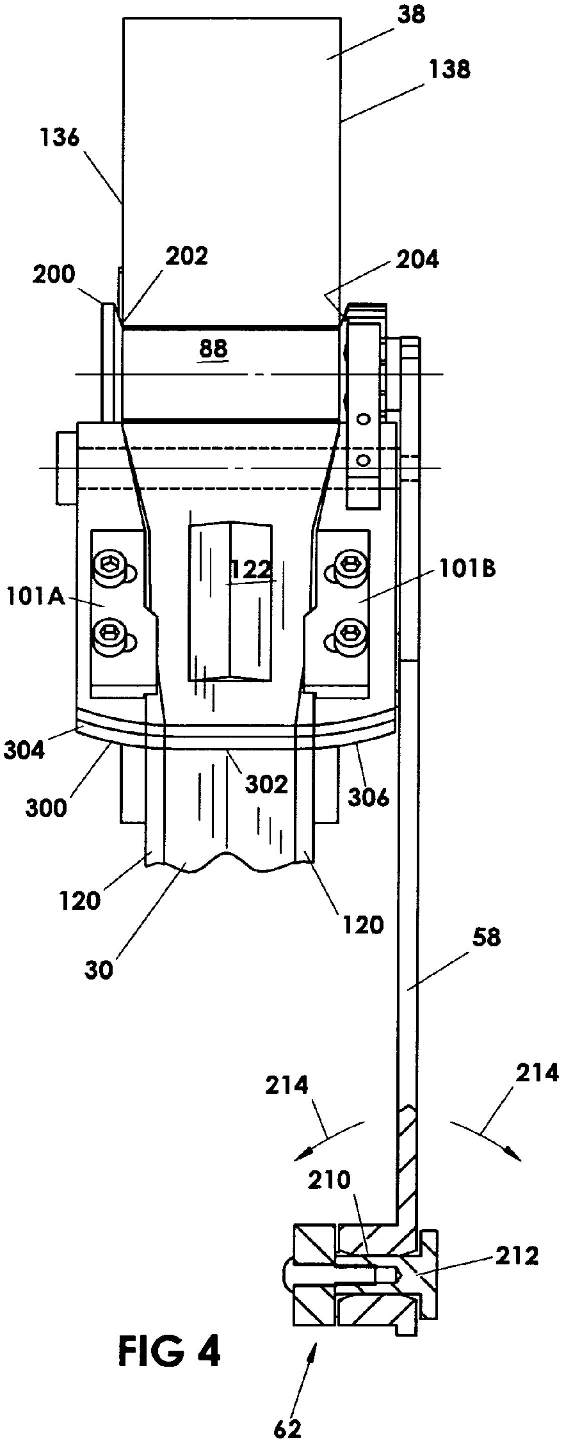
FIG. 4 is a schematic illustration of the pivotal mounting that permits rotational and lateral movement of the dancer arm that supports the dancer platform that mounts the folding station.
Figure 5:
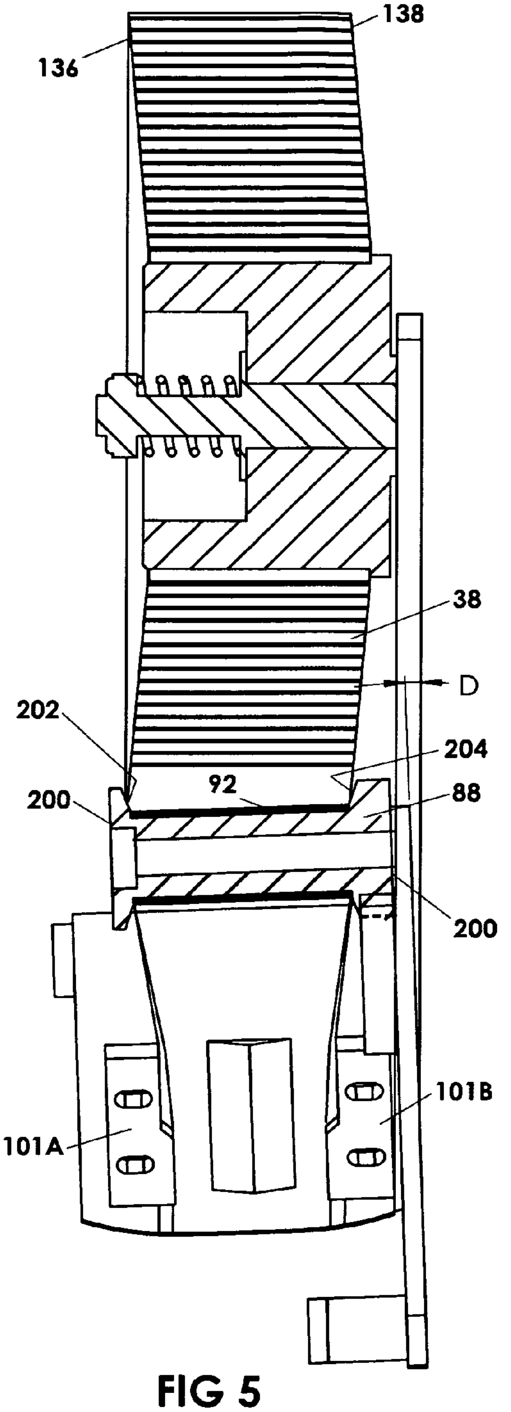
FIG. 5 is a schematic plan view illustrating the lateral movement of the dancer platform and thus the folding station to maintain alignment of the folding station with the tape.

The nip roll 88 is preferably provided with a pair of flanges 200 one at each axial end of the roll 88 and spaced apart so that the inside surfaces 202 and 204 are as illustrated tapered towards each other as they approach the shaft of the roll 88 and at their ends adjacent to the roll 88 are immediately adjacent to their adjacent side faces 136 and 138 of the roll 38 immediately adjacent to the periphery 98 of the roll 38. This intimate contact between the flange surfaces 202 and 204 and their respective adjacent side faces 136 an 138 of the roll 38 adjacent to the coated surface 92 cause the roll 88 to be shifted axially which causes the platform 56 and folding station 40 to shift laterally as indicated by the dimension D when the position of the roll contacting teh surface 92 moves laterally (axially relative to axis 68) and thereby maintain alignment of the tape path 54 with the folding station 40 (see FIGS. 4 and 5). The flange 200A is in effect formed by the cog wheel 94 by providing the tapered surface 204 on the face of the cog wheel 94 adjacent to the tape 30.

To accommodate the required lateral movement of the dancer arm 58 and platform 56 the pivot 62 which provides the pivotal mounting that accommodates relative side and rotational movement of teh dancer arm 58 and platform 56 is formed with free space or play between the bore 210 and the shaft 212 so that the arm 58 may move as indicated by the arrow 214 (see FIG. 4) and rotate around the haft 212.

The downstream end of the platform 56 provides a tape expanding surface 300 that has a central portion 302 substantially perpendicular to the tape path 54 (parallel to axis 68) and a pair of guide surfaces 304 and 306 symmetrically positioned on opposite sides of the central portion 302. Forcing the tape 30 against these surfaces 302, 304 and 306 (as obtained by so directing the tape path 54) bends the tape 30 around the surfaces 302, 304 and 306 which allows the folded tape edges to tend to expand or spread laterally. The length of the central portion 302 measured parallel to the axis 68 is less than the spacing between the side folding guides.

The operation of the cog wheel 92 and latch 94 is as follows: When tape 30 is not being withdrawn for application to a case being taped there is little or no tension in the tape 30 and the spring 59 pivots the platform 56 clockwise around the pivot 57 (See FIGS. 6 and & 7) which moves the latch 94 into engagement with the cog wheel 92 and prevents rotation of the nip roll 88. When tape 230 is being withdrawn by movement of the case being taped (as is well known) tension is applied to the tape 30 which moves the platform 56 counterclockwise around axel 57 (as shown in FIG. 7) to move the latch 94 from the cog wheel 92 and permit the roll 88 to rotate and the tape 30 to be withdrawn. This stopping and releasing of the roll 88 aids significantly in obtaining proper operation of the machine.

Figure 2:
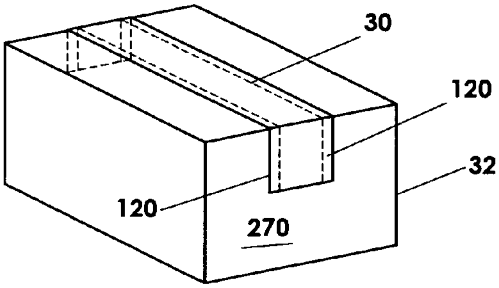
FIG. 2 shows a typical taped carton with a tape applied using one form of the present invention.

Turning to FIG. 2 it can be seen how the folded edges 120 extend along each side of the tape 30 used to close the box or case 270 and provide areas that are not adhered to the case so that they may be grasped to help open the case 270 and strengthened areas long each side of the tape.

While the description has dealt with forming a tape 30 with fold edges 120 at each side of the tape it will be apparent that only one side need be folded. Similarly the guiding mechanism formed by the flanges 200 could also be obtained using only one flange 200 at one end of the roll and biasing the one flange 200 against the adjacent side face of the roll 38.

Having described the invention, modifications will be evident to those skilled in the art without departing from the scope of the invention as defined in the appended claims.

I claim:

1. A tape applicator comprising a front applicator for applying a leading end of a tape to a case being taped and a rear applicator for pressing a trailing end of said tape to said case, a connector interconnecting said front and rear applicators for interaction, a tape roll providing a source of said tape, said tape having an adhesive side and a non-adhesive side, a path of said tape from said tape roll to said front applicator, the improvement comprising; a dancer arm mounting a dancer platform that is positioned along said a path of said tape between said tape roll and said front applicator and adjacent to said tape roll, a nip roll rotatably mounted on a free end of said dancer arm adjacent to said tape roll, means biasing said dancer arm to press said nip roll onto a periphery of said tape roll and against said non adhesive side of said tape, a tape folding station mounted on said dancer platform and through which said tape on said tape path passes to fold at least one side edge of said tape onto an adjacent adhesive side of said tape to form a folded edge on said tape as said tape travels through said folding station on said path.

2. A tape applicator as defined in claim 1 wherein said dancer arm at its end remote from said nip roll is mounted on a dancer arm pivotal mounting that allows relative side and rotational movement of said dancer arm.

3. A tape applicator as defined in claim 2 wherein guide means are provided to sense the position of said periphery of said tape roll and align said dancer arm and thereby said platform with said periphery of said tape roll.

4. A tape applicator as defined in claim 3 wherein said guide means comprises at least one flange on said nip roll that remains engaged an adjacent side face of said roll to move said nip roll and thereby said dancer platform depending on the position of said adjacent side of said roll.

5. A tape applicator as defined in claim 4 wherein said dancer platform is pivotably mounted on said dancer arm on a dancer platform axel and a spring biases said platform to rotate on said axel in one direction.

6. A tape applicator as defined in claim 5 wherein said nip roll has a cog wheel at one end and wherein a latch that cooperates with said cog wheel is fixed to said platform and moves into engagement with said cog to stop movement of said nip roller when said platform is rotated in said one direction.

7. A tape applicator as defined in claim 4 wherein said dancer arm pivotal mounting that allows relative side and rotational movement of said dancer platform is mounted to an adjustment bar which in turn is mounted for movement perpendicular to said tape path to laterally adjust the position of said tape.

8. A tape applicator as defined in claim 3 wherein said guide means comprises a pair of flanges one adjacent to each end of said nip roll and spaced to snugly receive side faces of said roll adjacent to said periphery of said roll to move said nip roll and thereby said dancer platform depending on the position of said side faces of said roll.

9. A tape applicator as defined in claim 8 wherein said dancer platform is pivotably mounted on said dancer arm on a dancer platform axel and a spring biases said platform to rotate on said axel in one direction.

10. A tape applicator as defined in claim 9 wherein said nip roll has a cog wheel at one end and wherein a latch that cooperates with said cog wheel is fixed to said platform and moves into engagement with said cog to stop movement of said nip roller when said platform is rotated in said one direction.

11. A tape applicator as defined in claim 8 wherein said dancer arm pivotal mounting that allows relative side and rotational movement of said dancer platform is mounted to an adjustment bar which in turn is mounted for movement perpendicular to said tape path to laterally adjust the position of said tape.

12. A tape applicator as defined in claim 3 wherein said dancer platform is pivotably mounted on said dancer arm on a dancer platform axel and a spring biases said platform to rotate on said axel in one direction.

13. A tape applicator as defined in claim 12 wherein said nip roll has a cog wheel at one end and wherein a latch that cooperates with said cog wheel is fixed to said platform and moves into engagement with said cog to stop movement of said nip roller when said platform is rotated in said one direction.

14. A tape applicator as defined in claim 12 wherein said dancer arm pivotal mounting that allows relative side and rotational movement of said dancer platform is mounted to an adjustment bar which in turn is mounted for movement perpendicular to said tape path to laterally adjust the position of said tape.

15. A tape applicator as defined in claim 3 wherein said dancer arm pivotal mounting that allows relative side and rotational movement of said dancer platform is mounted to an adjustment bar which in turn is mounted for movement perpendicular to said tape path to laterally adjust the position of said tape.

16. A tape applicator as defined in claim 2 wherein said dancer platform is pivotably mounted on said dancer arm on a dancer platform axel and a spring biases said platform to rotate on said axel in one direction.

17. A tape applicator as defined in claim 16 wherein said nip roll has a cog wheel at one end and wherein a latch that cooperates with said cog wheel is fixed to said platform and moves into engagement with said cog to stop movement of said nip roller when said platform is rotated in said one direction.

18. A tape applicator as defined in claim 17 wherein said dancer arm pivotal mounting that allows relative side and rotational movement of said dancer platform is mounted to an adjustment bar which in turn is mounted for movement perpendicular to said tape path to laterally adjust the position of said tape.

19. A tape applicator as defined in claim 16 wherein said dancer arm pivotal mounting that allows relative side and rotational movement of said dancer platform is mounted to an adjustment bar which in turn is mounted for movement perpendicular to said tape path to laterally adjust the position of said tape.

20. A tape applicator as defined in claim 2 wherein said dancer arm pivotal mounting that allows relative side and rotational movement of said dancer platform is mounted to an adjustment bar which in turn is mounted for movement perpendicular to said tape path to laterally adjust the position of said tape.

* * * * *